United States Patent
Terry

[15] 3,636,537
[45] Jan. 18, 1972

[54] MULTICHANNEL REMOTE-MEASURING NETWORK

[72] Inventor: Jacques Terry, 14 Allee Diamant-Foret de Vernon, 276 Vernon, France

[22] Filed: Feb. 26, 1970

[21] Appl. No.: 14,539

Related U.S. Application Data

[63] Continuation-in-part of Ser. No. 807,666, Mar. 17, 1969.

[52] U.S. Cl. .......................... 340/182, 340/177 CA, 340/191, 340/200
[51] Int. Cl. ............................................. G08c 15/00
[58] Field of Search ................... 340/182, 177 CA, 200, 191; 73/1 R, 1 B, 1 DV; 324/130, 56

[56] References Cited

UNITED STATES PATENTS

| 3,394,581 | 7/1968 | Johnson | 73/1 R |
| 3,555,418 | 1/1971 | Fluegel | 324/130 |
| 3,390,286 | 6/1968 | Gradin et al. | 310/8.1 |
| 3,455,148 | 7/1969 | Foster et al. | 340/262 |

Primary Examiner—Thomas B. Habecker
Assistant Examiner—Robert J. Mooney
Attorney—Waters, Roditi, Schwartz & Nissen

[57] ABSTRACT

A precision, remote-measuring network with a plurality of channels each including a local sensor. A remote control is connected to each channel and includes a calibrating oscillator. Measurement transmitter and control devices are connected to the sensors and include a variable capacitor coupled to the oscillator and a relay connected between the sensors and capacitor whereby a capacitance bridge is formed. A hermetically sealed housing encloses the capacitors.

15 Claims, 8 Drawing Figures

MULTICHANNEL REMOTE-MEASURING NETWORK

This is a continuation-in-part of copending application Ser. No. 807,666 filed Mar. 17, 1969.

DETAILED DESCRIPTION

The present invention relates to a multichannel remote-measuring network. Types of remote-measuring equipment are known which, for the purpose of calibrating the detectors of information associated with the different channels, possess a calibrating oscillator capable of supplying a calibrating AC voltage applied to a plurality of sensors. Generally, however, the remote-measuring equipment heretofore known does not allow effecting in a single operation and simultaneously, prior to measurement, the calibration of a considerable number of sensors connected at points not necessarily having identical potential.

Essentially, the present invention endeavors to solve this problem, by creating a measuring network provided with various means for rapid calibration.

For this purpose, a precision remote-measuring network is provided possessing several channels, each of which includes a capacitive-impedance sensor located at a point where a mechanical value is to be measured as well as a remote-control assembly connected to all channels, which centralizes all the information received from the sensors and assures its recording in an information base, and each of which also includes amplifiers associated with each of the channels, a general power supply system and a calibrating oscillator. This network is characterized in that it comprises measurement-transmitting and control devices suitably connected to the various sensors and located in their immediate vicinity, each of which devices includes a variable capacitor connected to the calibrating oscillator, as well as a relay connected to the remote control system and serving for bringing into the circuit the capacitor of the capacitive-impedance sensor in such a manner that a capacitive voltage divider bridge is formed, to which the reference signal produced by the calibrating oscillator can be applied for the testing and calibration of each channel.

The remote-measuring network according to the invention, which may, for example, possess 16 channels, makes it possible to perform precise measurements over a wide range of frequencies, for example, between 0.3 and 20,000 Hz. It also offers the possibility of application at short notice, it can operate in critical ambients and possesses great reliability, particularly by assuring the normal operation of all other channels, if one channel should have failed.

There follows below, as an example and without limitation, the description of an embodiment of the present invention with reference to the accompanying drawing.

Figure 1:
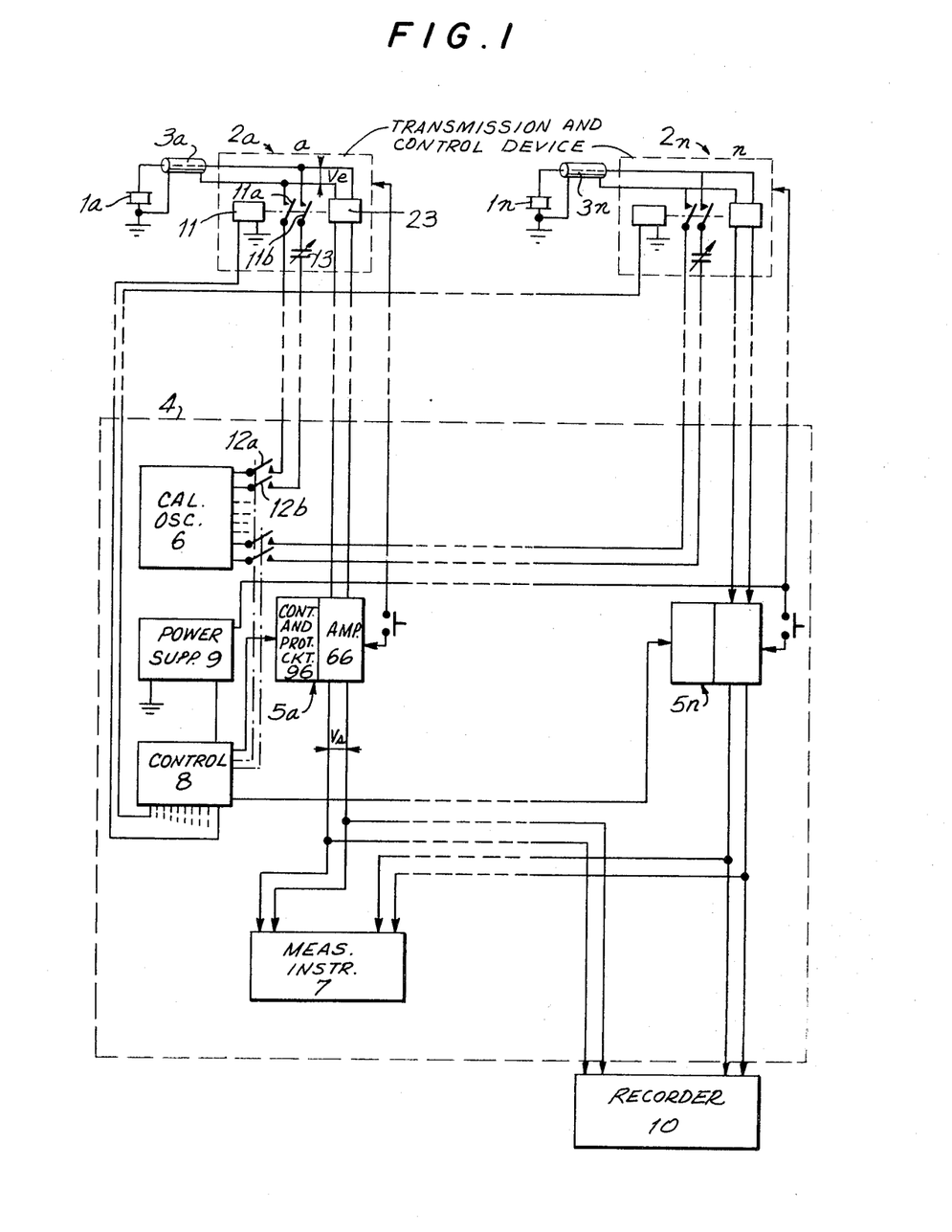
FIG. 1 is a schematic representation of a remote-measuring network according to the invention.

The measuring network according to the invention, which is schematically represented in FIG. 1, includes as many piezoelectric sensors, as there are measuring channels. In one particular embodiment of the invention, the network has 16 channels and, consequently, 16 sensors or detectors, only two of which, namely the ones referenced as $1a$ and $1n$ and associated with the measuring channels $a$ and $n$, respectively, are shown in FIG. 1. These detectors are provided for measuring at certain predetermined points, forces, vibrations, accelerations, pressures, etc. Each one of the detectors $1a...1n$ is connected by means of calibrated coaxial cables $3a...3n$ to its corresponding measurement transmission and control device $2a...2n$.

The devices $2a...2n$ connected to the various detectors $1a...1n$ make possible transmission over long distances, with common-mode rejection, of the measurements made by the detectors. The various measurements are, for example, made in open air at temperatures which may attain, for short times, several hundreds of degrees and under vibratory conditions which may attain 40 G's (G being the acceleration due to gravity). The devices $2a...2n$ also make possible the remote verification, prior to measuring, of the detectors, as well as the calibration of the complete channel circuits.

The measuring network also includes, located at a certain distance from the transmission and control devices $2a...2n$, a control and calibration bay 4. This bay has $n$ assemblies $5a...5n$ associated with the channels $a...n$, a calibrating oscillator 6, a measuring instrument 7 with its associated circuitry, a control assembly 8, and a general power supply 9.

The assemblies $5a...5n$, which are associated with the $n$ measuring channels, are each connected, wire for wire, to the transmission and control devices $2a...2n$. The assemblies $5a...5n$ permit, on the one hand, energizing all of the equipment of a channel and protecting its circuits in such a manner that a failure in one channel will not disturb the operation of the others and, on the other hand, regulating the gain in each channel and transmitting, at low impedance to a magnetic recorder 10, signals having the desired amplitude.

The calibrating oscillator puts out a pure sinusoidal signal, very stable in frequency and of highly constant amplitude, at four selectable output levels, as will be described in detail below.

The control assembly 8 consists of keyboards, relays and logical circuits, as will be described below in detail with reference to FIGS. 7 and 8, and permits the exercise of the following control, verification and calibration functions:

control of the channels, one by one, or simultaneously;
control of the oscillator and selection of the channels to be calibrated;
nulling control for every channel;
control of gain in each channel and calibration of same;
control of linearity for each channel;
control of the response of each channel to a mechanical excitation;
simultaneous calibration of all channels by the transmission of calibrated-level signals to all channels of the recorder.

The following is a description of the manner in which the calibration of a channel of the measuring network is carried out.

Considering, for example, the piezoelectric detector $1a$ of the channel $a$, one can see in FIG. 1 that the transmission and control device $2a$ associated with this detector includes a relay 11 characterized by a very high insulation and good resistance to vibratory conditions and having two N/O contacts $11a$ and $11b$. These contacts are connected, on the one hand, to the shield and to the central conductor of the coaxial cable $2a$ respectively and, on the other hand, to the output terminals of the oscillator 6 via two more normally open contacts $12a$ and $12b$ of a relay forming an element of the control assembly 8. The N/O contacts $11b$ and $12b$ are connected in series with a variable capacitor 13 of small value, which capacitor is an element of the device $2a$.

As it will be shown further below, the oscillator 6 can deliver at its output terminals a pure sinusoidal signal, the amplitude of which can have one of four preset values, each of which corresponds, for example, to accelerations of 5, 10, 20 and 40 G, respectively.

For calibrating the detector 1a, one applies to the input of the device 2a a signal from the oscillator, whose amplitude corresponds to a given number N of G's. Since the characteristics of that detector are known, namely its sensitivity δ in mv./g., one determines at the terminals of the detector 1a a voltage $$V_e = N\delta(mv.).$$

For this purpose, one triggers the closing of the N/O contacts 11a, 11b by exciting the relay 11 from the control assembly 8, and one actuates also the closing of the N/O contacts 12a and 12b as will be seen below. This has the effect of connecting the variable capacitor 13 in series with the capacitive detector 1a and the output of oscillator 6. The calibrating signal delivered at the output terminals of the oscillator 6, which has an amplitude V corresponding according to the particular case to 5, 10, 20 or 40 G's, is applied in this manner to a capacitance voltage divider constituted, on the one hand, by the detector 1a (capacitance $C_t$ constituted by the capacitances of the detector 1a proper, of the coaxial cable 3a and by the stray capacitances held to a minimum by this circuitry) and, on the other hand, by the small-value variable capacitance Γ, which results from the series connection of the capacitor 13. All these elements are most thoroughly insulated in order to minimize stray capacitances and maintain the precision of the divider bridge.

There results:

$$V_e = \Gamma / (C_c + \Gamma) = N\delta.$$

Adjustment of the capacitance Γ of the trimmer 13 makes it possible to assure this relationship. Γ has a small value for considerations of mechanical behavior, in order to facilitate the adjustment and in order to avoid excessive loading of the detector in the event that Γ were inadvertently left in circuit for a measuring operation. In this case, a systematic error of about 10 percent would be committed.

Since the capacitance of aforesaid divider bridge is very high, the voltage $V_e$ is measured at the output of the input stage as will appear later from FIG. 3.

Calibration of the measuring channel is effected by adjusting the gain of assembly 5a in such a manner that a signal $V_s$ of given amplitude is obtained at its output terminals. In this manner, there has been established a correspondence between the given number N of G's (value of the acceleration) and the value of the output voltage $V_s$ in volts delivered by the assembly 5a. The same can be done for all other channels.

Since the calibrating signal V is always identical, the calibration of the recorder can be effected simultaneously for all channels. It should be noted, moreover, that this procedure makes it possible to detect faults, if any, in a detector or its connecting cable.

There will now be described, with reference to FIG. 2, the details of a measurement-transmission and control device a device 2a for use in FIG. 1.

Figure 2:
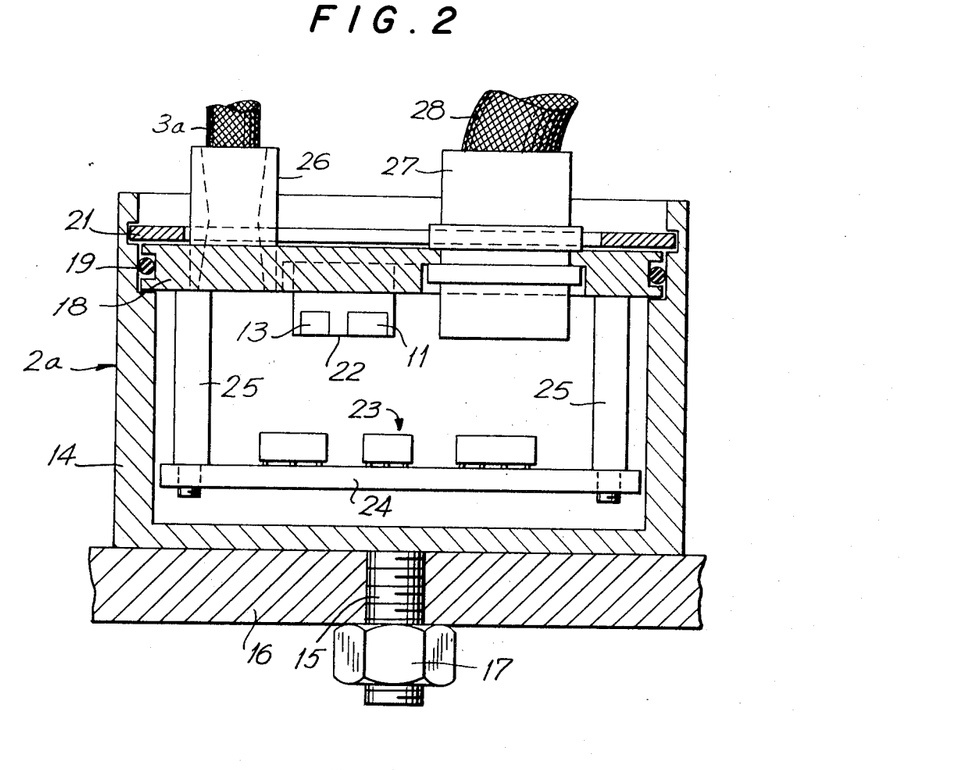
FIG. 2 is a view in sectional elevation of the measurement transmission and control device associated with each capacitive sensor in the network of FIG. 1.

The device 2a in FIG. 2 is packaged in a sealed cylindrical housing 14 for easy mounting as well as for protection from heat convection and corrosion. This housing 14 has an integral axial screw 15 for attaching it to a support 16 by means of a nut 17. The housing 14 is closed by a cover 18 provided with an hermetic O-ring seal 19, held in place by a circlip 21.

All of the internal components accommodated inside the housing 14 are integral with the cover 18. As can be seen in FIG. 2, this cover holds, on the one hand, the variable capacitor 13 and its control relay 11, both mounted on an insulated and suspended printed circuit 22 and, on the other hand, a matching circuit 23 carried by a printed-circuit board 24 attached to the cover by means of the small posts 25.

The cover lid 18 is also provided with two sealed bushings 26 and 27 serving for the connection of the coaxial cable 3a of the detector, and of an eight-conductor cable 28 connected to the corresponding assembly 5a of the measuring network, respectively.

Figure 3:
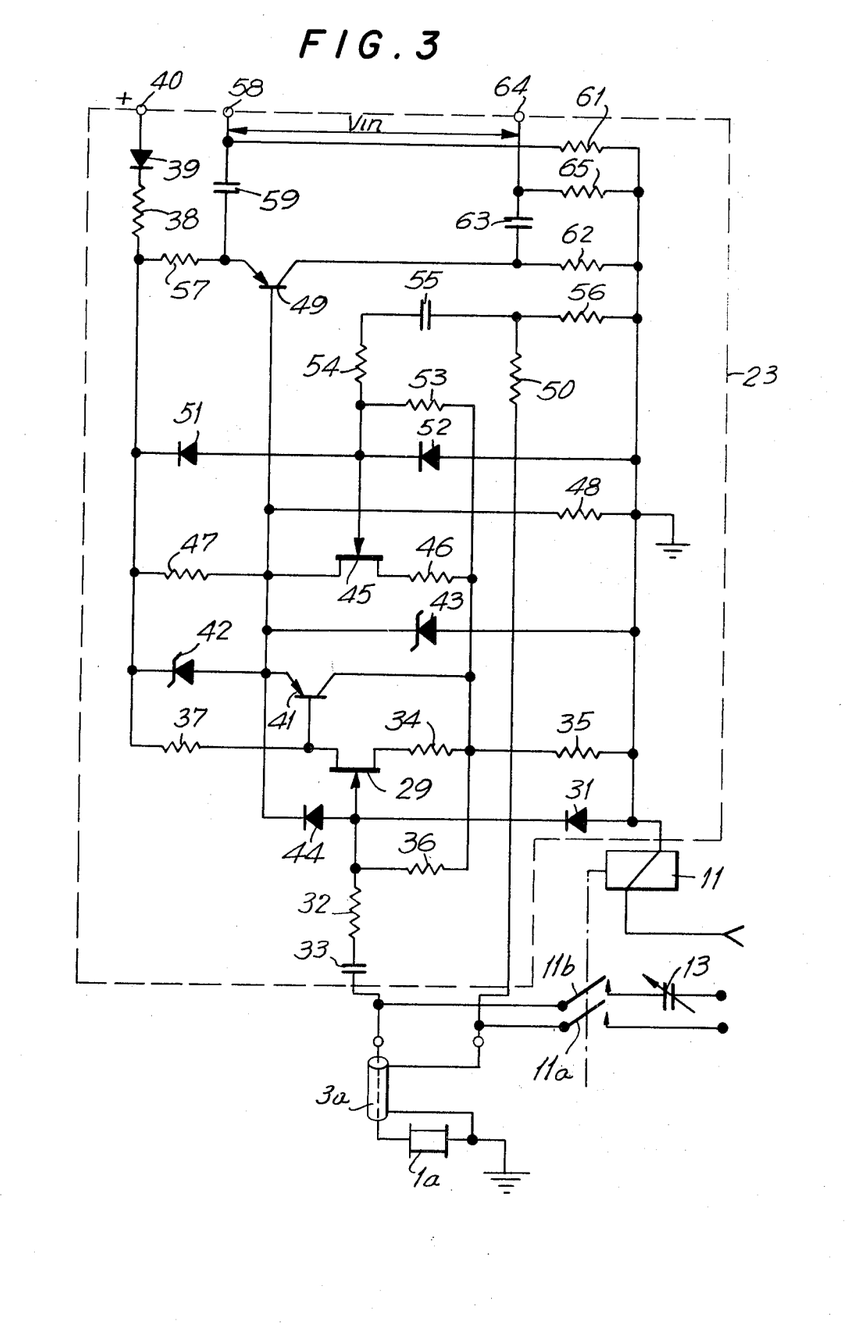
FIG. 3 is a schematic diagram of the measurement transmitting and control device associated with each capacitive sensor in the network of FIG. 1.

FIG. 3 is a schematic diagram of the matching circuit 23 which is a part of the measurement transmission and control device 2a. This matching circuit has an input impedance higher than 500 MΩ (which actually lies between 800 and 1,000 megohms), and it has a common-modes (phantom circuits rejecting characteristic, a wide passband (from 0.3 to 20,000 Hz.) and offers symmetrical low-impedance outputs.

The matching circuit 23 comprises a first field-effect transistor 29, whose base or gate electrode is connected, on the one hand, to ground via a diode 31, and, on the other hand, to the input terminal which is connected to the central conductor of the coaxial cable 3a via a resistor 32 and a capacitor 33. The emitter electrode of the field-effect transistor is connected to ground via two resistors 34 and 35 in series, with the junction point of the two resistors being connected to the base electrode via a third resistor 36. The collector electrode of the transistor is connected via a resistor 37 to another resistor 38 which is connected by a diode 39 to a supply terminal 40 which, in operation, is maintained at a positive potential of, for example, 30 volts.

The circuit 23 includes furthermore a transistor 41 of the PNP-type, the base of which is connected to the collector electrode of the FET-transistor transistor 29, whereas its collector is connected to the junction point between the two resistors 34 and 35. The emitter of the PNP-transistor 41 is connected, on the one hand, to the junction point between Zener diodes 42 and 43 which lie in series between the junction point of resistors 37 and 38 and ground and, on the other hand, to the gate electrode of the FET-transistor transistor 29 via a diode 44.

The circuit 23 also possesses a second field-effect transistor 45 whose source electrode is coupled by a resistor 46 to the collector of the transistor 41, i.e., to the junction point of resistors 34 and 35. The drain electrode of this FET 45 is connected to the resistor 38 via another resistor 47, to ground via resistor 48 and directly to the base of a PNP-type transistor 49. The gate of the FET 45 is connected to the junction point between the two diodes 51 and 52, series connected between resistor 38 and ground, and, via resistor 53, to the junction point of resistors 34 and 35. The gate of the FET 45 is also connected to ground over a resistor 54, a capacitor 55 and a resistor 56, all connected in series. The junction point of the capacitor 55 and the resistor 56 is connected by a resistor 50 to the other input terminal of the impedance-matching circuit 23, which is connected to the shield of the coaxial cable 3a.

The emitter of transistor 49 is connected, on the one hand, to resistor 38 via a resistor 57, and, on the other hand, to an output terminal 58 via the intermediary of a capacitor 59, this output terminal being itself connected to ground by a resistor 61. On the other hand, the collector of transistor 49 is connected to ground by a resistor 62 and via a capacitor 63 to another output terminal 64 which in turn is grounded by a resistor 65.

In the circuit just described, one and the same signal is applied to the gate and source electrodes of the input FET 29, and an identical signal is also applied between the gate and source electrodes of the FET 45, mounted in opposition, whereby rejection of the common modes is achieved. Thereafter, the signal is amplified by the transistor 49 and the amplified signal Vm appears between the output terminals 58 and 64.

The supply for the circuit 23 is furnished from the control bay 4 via the cable 28 through the sealed bushings 27 (FIG. 2), whereas the coaxial cable 3a introduces the signal furnished by the detector 1a immediately to the printed circuit 24, which carries all the elements constituting the impedance-matching circuit 23, with the coaxial cable 3a passing through the sealed tubular bushing 26, to which the protective sheath of the cable is attached.

Figure 4:
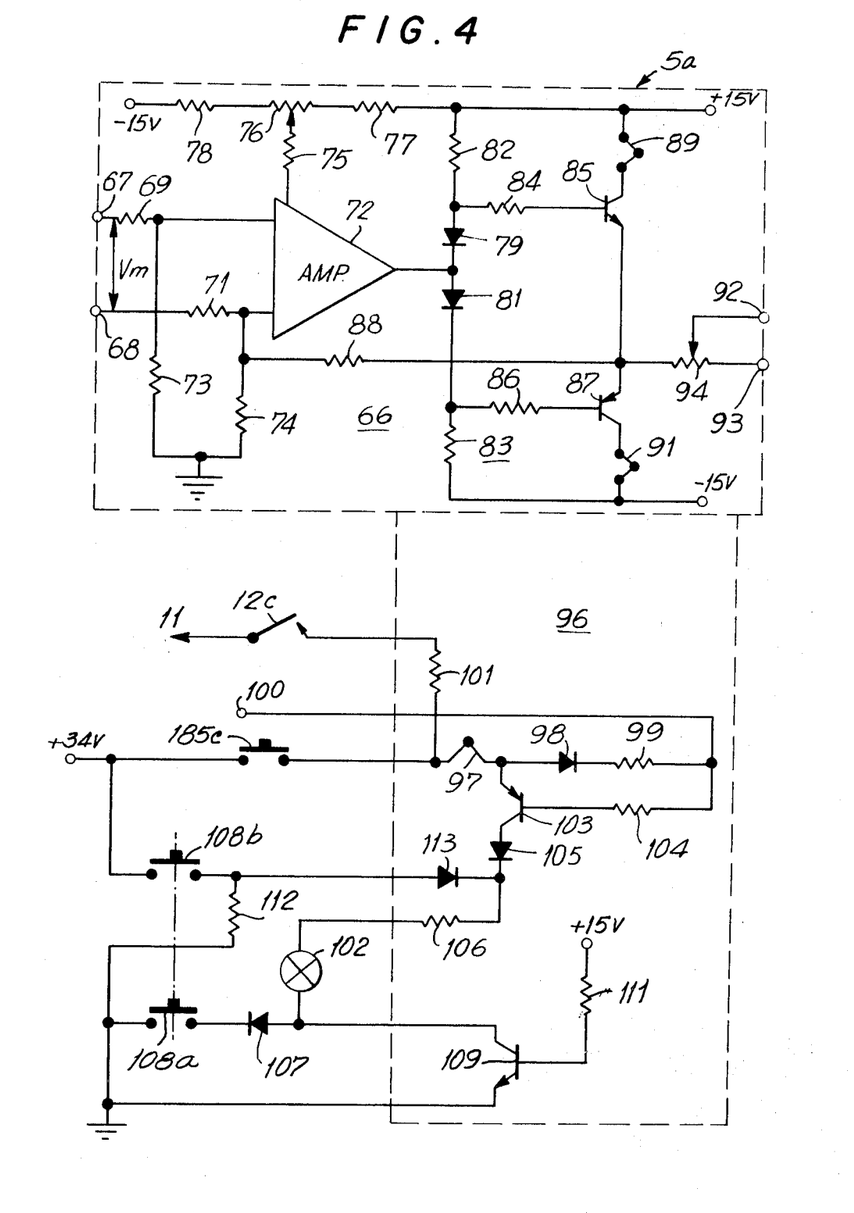
FIG. 4 is a schematic diagram of an assembly for amplification, control and protection associated with the measurement transmission device of FIG. 2.

A description follows, with reference to FIG. 4, of one of the devices 5a...5n, which are centralized in the control bay and which assure, on the one hand, control and protection of the circuits, and on the other, adjustable gain of the measurement signal.

Each of these devices comprises first of all an adjustable-gain amplifier circuit 66 possessing two input terminals 67 and 68, which are connected to the output terminals of the impedance-matching circuit 23, which furnish the measurement signal Vm. The two input terminals 67 and 68 are connected by resistors 69 and 71 to the two input terminals of a control amplifier 72, which are grounded via resistors 73 and 74. Null adjustment of the amplifier 72 is realized by means of a circuit which consists of a resistor 75 connected to the slide-contact of a potentiometer 76 connected between two resistors 77 and 78, which are connected to +15-volt and −15-volt supplies, respectively. The output of the control amplifier 72 is connected to the junction of diodes 79 and 81, series connected, in the same sense, with the resistors 82 and 83 between the +15-volt and −15-volt poles. The junction between the diode 79 and the resistor 82 is connected by resistor 86 to the base of another PNP-type resistor 87. The emitters of the PNP-transistors 85 and 87 are jointly connected by a resistor 88 to the input terminal 69 of the control amplifier 72. The collectors of these transistors 85 and 87 are connected to the +15-volt and −15-volt supplies, respectively, via the positive-temperature-coefficient resistors 89 and 91. Finally, the adjustable-output signal is derived between the two terminals 92 and 93, one of which is connected to the slide contact, the other to one end of a control potentiometer 94, the other end of which is connected to the emitters of the two transistors 85 and 87.

From the preceding description, it can be understood that the amplifying circuit 66 is a symmetrical amplifier, the first stage of which is supplied with constant current and whose output stage is a push-pull series amplifier formed by the transistors 85 and 87, which supplies a 200-ohm potentiometer 94. The amplitude of the output signal attains ±8 volts. The circuit is designed for controlling a magnetic recorder by voltage or a moving-coil loop by current, as will be explained in detail hereinafter.

Also to be seen in FIG. 4 is the schematic of a control and protective circuit 96 which forms part of each of the amplifier and control devices 5a...5n. The control and protective circuit 96 comprises a thermistor 97, a diode 98 and a small-value (for example: 10 ohms) resistor 99, which are all connected in series by a pushbutton contact 185c of control assembly 8 between the +34-volt polarity point of the general power supply system 6 and an output terminal 100 having the approximate potential +30 volts, and which is connected to the corresponding supply terminal 40 in the schematic of FIG. 3. Moreover, the junction point between the "ON" pushbutton contact 185c and the positive temperature coefficient thermistor 97 is connected via a resistor 101 to an N/O contact 12c of a relay 12 (FIG. 8), this contact 12c being in turn connected to the relay 11 of FIG. 3. When the measurement-transmission and control device 2a is connected to the assembly 5a, and the contact 185c is closed, the supply current will flow through thermistor 97, diode 98 and resistor 99, and the voltage appearing at the junction point between thermistor 97 and diode 98 causes a signal lamp 102 to light up. This lamp is connected in series with the emitter-collector circuit of a transistor 103, the base of which is connected to terminal 100 via a resistor 104, whereas its collector is connected to the signal lamp over a diode 105 and a resistor 106. On the other hand, the signal lamp 102 is connected to ground by a diode 107 and a contact 108a actuated by a "visual test" pushbutton 108 pertaining to the control assembly represented in FIG. 7. The signal lamp 102 is also connected to the collector of a NPN-type transistor 109, whose base is connected by a resistor 111 to the +15-volt polarity point, whereas its emitter is grounded.

When the device 2a is connected, the transistor 103 is "on" and a current flows through it through lamp 102 and through the transistor 109 so that the lamp is lit.

In the case of excessive supply current, the heating up of the positive temperature coefficient thermistor 97 causes a considerable increase in its resistance value so that the voltage across it becomes equal to the supply voltage. Thus, the power supply is protected and the normal operation of all other channels assured. In this case, the signal lamp, since it is connected upstream of the thermistor, goes out on account of the shutting off of transistor 103. Thus, the abnormal extinction of the signal lamp 102 signifies an open circuit or a short circuit.

For carrying out a visual checkup, another N/O contact 108b also closes upon actuation of the pushbutton 108. This N/O contact 108b is connected to the +34-volt supply and, on the other hand, to ground via a resistor 112 and, on the other hand, by a diode 113 to the junction point between the diode 105 and the resistor 106. Simultaneous closing of the pushbutton contacts 108a and 108b will thus cause the signal lamp 102 to light up.

Figure 5:
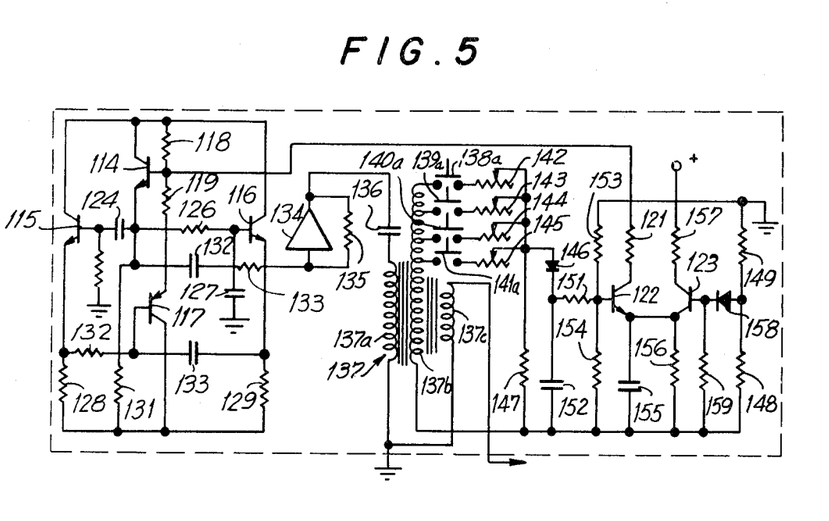
FIG. 5 is a schematic diagram of a calibrating power oscillator employed in FIG. 1.

There will now be described on the basis of FIG. 5, a particular embodiment of the calibrating oscillator. The oscillator 6 essentially comprises three NPN-type transistors 114, 115 and 116, as well as one PNP-type transistor 117. These four transistors operate as emitter-followers. The collectors of the transistors 114, 115, 116 are joined and connected to the emitter of transistor 117 via the intermediary of an ohmic voltage divider formed by two resistors 118 and 119, in series. The junction point between resistor 118 and 119 is connected to the base of the transistor 114 and also via a resistor 121 to the collector of a transistor 122 which, together with another transistor 123, forms a differential amplifier. The emitter of transistor 114 is connected, on the one hand, to a first RC circuit formed by a capacitor 124 connected to the base of the transistor 115 and to a resistor 125, the other end of which is grounded and, on the other hand, to a second RC circuit formed by a resistor 126 connected to the base of transistor 116 and to a capacitor 127 leading to ground. The emitters of transistors 115 and 116 are interconnected by the resistors 128 and 129, the junction point of which is connected by a resistor 131 to the emitter of transistor 114. Moreover, a third RC circuit, formed by a resistor 132 and a capacitor 133 in series, is inserted between the emitters of transistors 115 and 116, and the junction point between resistor 132 and capacitor 133 is connected to the base of the transistor 117, the collector of which is connected to the junction point between the resistors 128 and 129.

These three RC circuits constitute an inverse double-T bridge having separate legs, presenting a gain in excess of unity. Their time constants are governed by the relationships:

$R_1 R_2 C^2 \omega^2 = 1$ $R_1/R = \alpha = R/R_2$

Calculation reveals, that gain is achieved for $\alpha = 0.41$, and this gain amounts to 1.21.

On this same principle, another version of the oscillator can be utilized. This version uses a staggered inverse double-T bridge having separate legs, i.e., each of the first two circuits RC 124, 125 and CR 126, 127 is shunted in "staggered" arrangement by two identical circuits, connected between the emitters of transistors 114 and 115 for the first, and between the emitters of transistors 114 and 116 for the second RC circuit. The third circuit RC 132, 133 is connected across the median points of said two added circuits by two additional PNP-type emitter-followers. In this version, all RC circuits are identical, the oscillation frequency is determined by the relationship $RC\omega = 1$ and the circuit gain amounts to 1.5.

The output signal from the oscillator of very stable frequency is derived from the junction point between the emitter of transistor 114 and resistor 131 which, via a capacitor 132 and a resistor 133 in series, is connected to a power amplifier 134 having a resistor 135 connected between its input and output terminals. The output of the amplifier 134 is connected by a capacitor 136 to the primary winding 137a of a transformer 137. This transformer possesses a counterreactive secondary winding 137b, four taps of which are connected to four calibrated circuits, making it possible to obtain four different output levels. These four taps are connected, by the contacts 138a, 139a, 140a and 141a of corresponding pushbutton switches (FIG. 7) pertaining to the control assembly 8, to the corresponding calibrating potentiometers 142, 143, 144, and 145. The four pushbuttons 138 through 141 correspond to the selection of four different levels of oscillator output voltage, associated to accelerations of 5, 10, 20 and 40 G's, respectively.

The slide contacts of the potentiometers 142, 143, 144 and 145 are jointly connected to the anode of a diode 146 and to one end of a resistor 147, the other end of which is connected to the transformer winding 137b. The resistor 147 is ground-connected by two series resistors 148 and 149. The cathode of the diode 146 is connected, on the one hand, to the base of the transistor 122 via a resistor 151 and, on the other hand, by a capacitor 152 to the resistor 148. The base of transistor 122 is connected to ground by a resistor 153 and to the resistor 148 via a resistor 154. The emitters of the transistors 122 and 123 are jointly connected to the resistor 148 by a capacitor 155 and a parallel resistor 156. The collector of transistor 123 is connected to the positive pole by a resistor 157 and its base is connected to the junction point between the resistors 148 and 149 via a diode 158 and also to the resistor 148 via a resistor 159.

The differential amplifier constituted by the transistors 122 and 123 furnishes a stabilizing feedback signal which is applied to the base of the transistor 114 for the purpose of stabilizing the operation of the oscillator.

Figure 6:
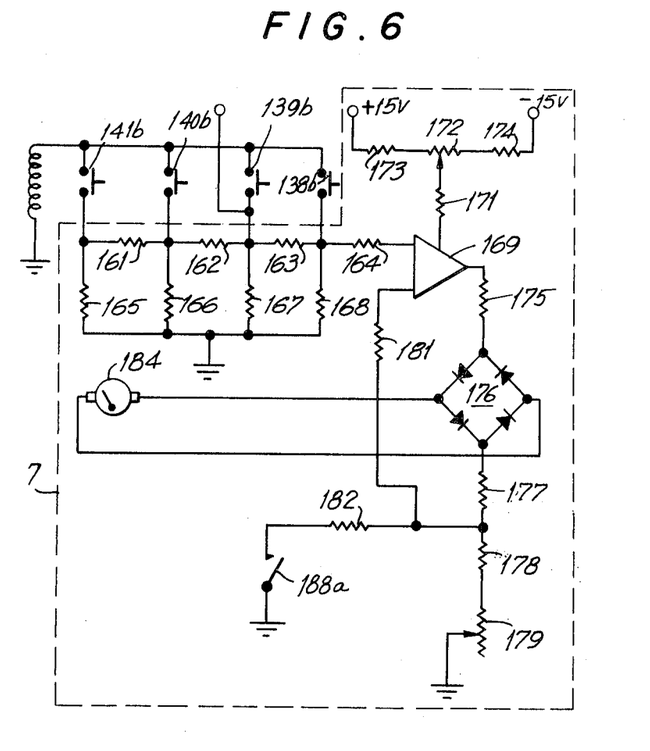
FIG. 6 is a schematic diagram of the circuit of a measuring instrument.

Moreover, the transformer 137 has a third stepdown winding 137c of 1/5 ratio, which delivers a signal suitable for utilization by the measuring instrument 7 (FIG. 6). The winding 137c is connected via the intermediary of the contacts 138b, 139b, 140b and 141b of the pushbutton switches 138 through 141 to the junction points of a resistive weighting network of constant impedance formed by the resistors 161, 162, 163 and 164 connected in series and four resistors 165, 166, 167 and 168 branching off to ground. The resistor 164 is connected to an input of differential amplifier 169. This amplifier 169 is connected by a resistor 171 to the slide contact of a potentiometer 172 which is in series with two resistors 173 and 174 between the +15-volt and −15-volt supplies. The output of the amplifier 169 is connected via a resistor 175 to one AC input terminal of a rectifier bridge 176, the other AC input terminal of which is connected to ground by the resistors 177 and 178 and a potentiometer 179 in series. The junction point between resistors 177 and 178 is connected to the other input of the amplifier 169 by a resistor 181 and also to ground by a resistor 182 and a null-verification contact 188a. Finally, a galvanometer 184 is mounted between the DC output terminals of the rectifier bridge 176.

The control assembly 6 will now be described with reference to FIGS. 7 and 8.

Figure 7:
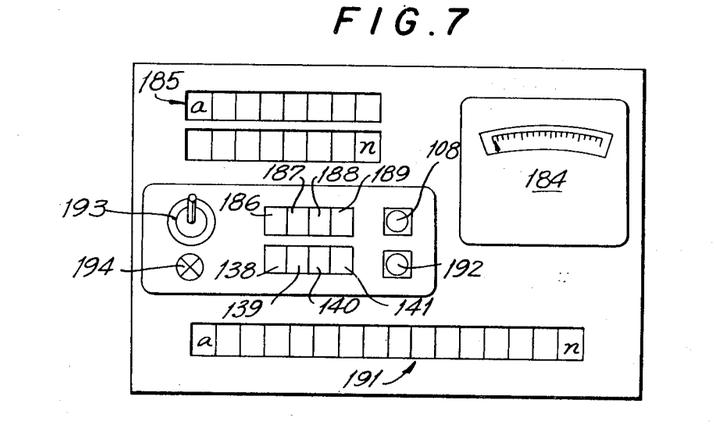
FIG. 7 is an elevation view of a control bay.
Figure 8:
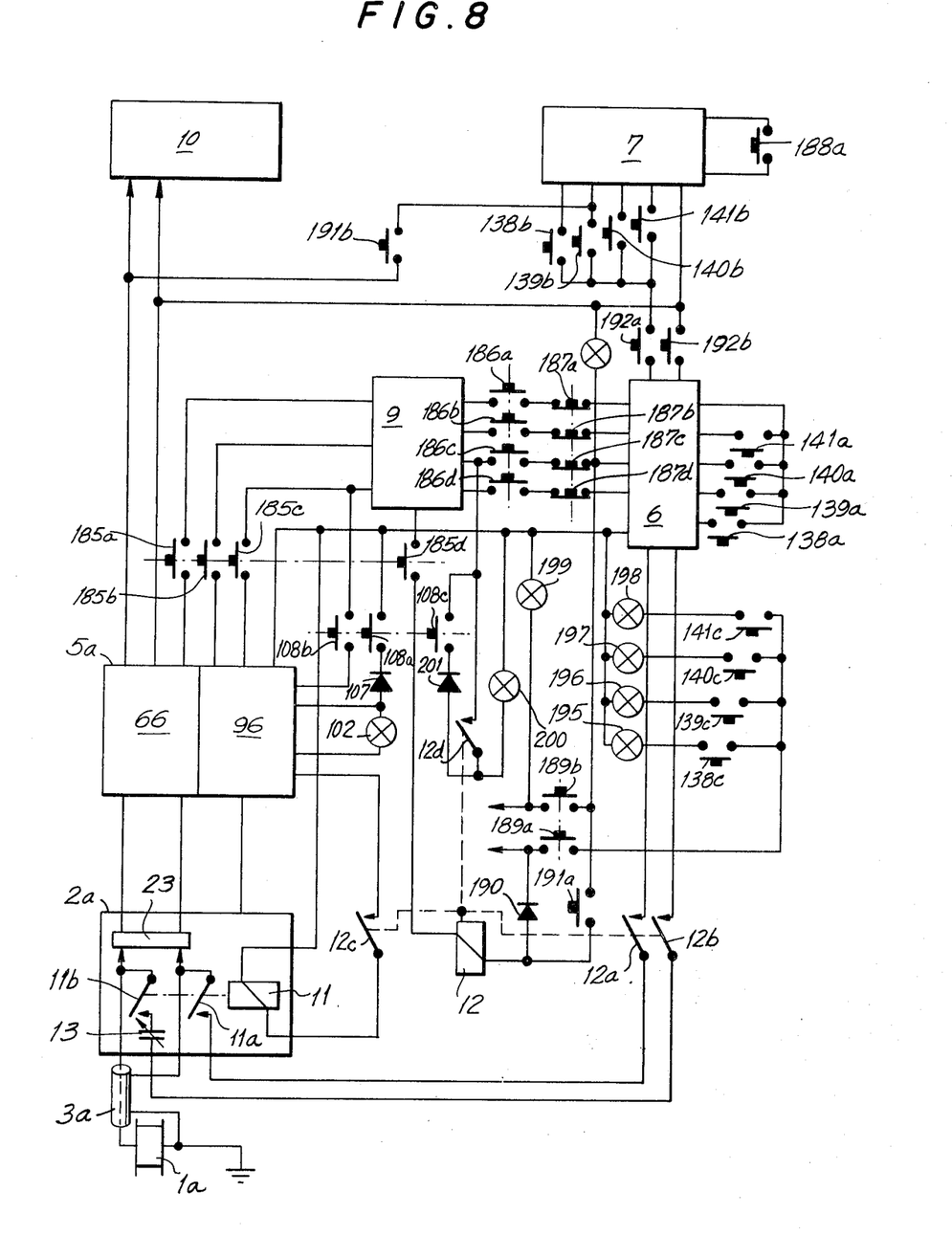
FIG. 8 is a schematic diagram showing all network connections for one single channel.

In FIG. 7, there is represented the bay in which the equipment of the remote-measuring network is assembled. This bay has in its upper portion a keyboard constituted by as many independent latch-in type pushbuttons 185 as there are measuring channels, which pushbuttons control the placing in service of the individual measuring channels a...n. Each of the pushbuttons 185 controls 4 contacts, as can be seen in FIG. 8 for the channel a, namely three contacts 185a, 185b and 185c, which are connected between the stabilized power supply 9, the amplification circuit 66 and the control and protective circuit 96 of the assembly 5a pertaining to channel a, respectively, and one contact 185d connected between power supply 9 and the relay 12. Each of the pushbutton controls 185 has a built-in signal light, similar to the lamp 102 of FIG. 4, which light serves for verification of the remote measuring channel as has been previously explained.

The control bay of FIG. 7 also contains four exclusive pushbuttons 138, 139, 140 and 141, which permit selection of one of the four "V" voltage levels of the calibrating oscillator, which correspond to accelerations of 5, 10, 20 and 40 G's, respectively. These pushbuttons, in addition to the contacts, such as 138a, 138b etc., also actuate other contacts 138c, 139c, 140c and 141c, which control the lighting of the signal lamps 195, 196, 197 and 198 associated with the various pushbuttons.

Additionally, the control bay possesses three exclusive pushbutton controls 186, 187 and 188 which serve, respectively, for placing in service the calibrating oscillator, for shutting it down to carry out an actual-conditions test, as well as a null checkup of the amplifier 169. A last, independent pushbutton 189 actuates general simultaneous calibration.

The pushbutton control 186 actuates four contacts 186a, 186b, 186c and 186d connecting four outputs of the general power supply 9 to four corresponding inputs to the oscillator 6, via the intermediary of four N/C contacts 187a, 187b, 187c and 187d of the pushbutton control 187 for "actual-condition" test. These latter contacts are open when the oscillator 6 is not in service during measurement of the response of the different sensors to mechanical excitation.

The control bay, moreover, contains a keyboard of 16 exclusive latch-in type pushbutton controls 191, which make it possible selectively to connect the oscillator output to whichever channel is to be calibrated, if that channel is energized, and to verify the channel output on the voltmeter 184 forming part of the measuring instrument 7. Each of the pushbutton controls actuates an N/O contact 191a, which is series connected with the relay 12 associated with the channel under consideration, in such a manner as to energize that relay whenever the two contacts 185d for switching on the channel, and 191a for calibrating the channel are closed. Energizing the relay 12 causes, due to the closing of its contact 12c, the energizing of relay 11 and, due to the closing of contacts 12a and 12b, the placing in circuit of the variable capacitor 13. The closing of a fourth contact 12d of relay 12 causes a signal light 200 associated with the pushbutton control 191 of the channel in question to light up.

The pushbutton control 191 also actuates another contact 191b, which connects the output of the amplifier 66 of assembly 5a to the measuring instrument 7 in order to assure the calibration of each channel.

The pushbutton control 189 for general calibration causes the hookup of the oscillator 6, by the intermediary of its contact 189a, and of a diodes logic circuit 190 of all energized channels, for recording of the calibration levels. These connections are effected by the relays 12 located in the control bay and by the relays 11 located in the measurement-transmission and control devices 2a...2n. Yet another contact 189b of pushbutton control 189 takes care of lighting the signal lamp 199 associated with this pushbutton control.

A momentary-contact pushbutton, corresponding to testing of the oscillator, allows checking the oscillator output on the measuring instrument. This control actuates two contacts 192a and 192b which connect the oscillator 6 to the measuring instrument 7.

Another momentary-contact pushbutton control 108, serving for verification of the signal lamps, makes it possible to test all signal lamps in the control bay. This control actuates three contacts 108a, 108b and 108c, the first two of which permit checking the lights 102 associated with the pushbutton controls 185. The third contact 108c is connected with a diode logic circuit 201, in parallel with the various contacts 12d in order to permit checking the signal lights 200.

A general switch 193 energizes all channels simultaneously. Its pilot light 194 synthetizes operation of all the various supplies.

What is claimed is:

1. Precision remote-measuring network comprising a plurality of channels, each of which includes a capacitive-impedance sensor adapted for being placed at a location where a mechanical value is to be measured, remote-control means connected to all of said channels for centralizing information received from the sensors, said means including amplifiers associated with each of the channels, power supply means and a calibrating oscillator generating a reference signal; measurement-transmission means and control means connected to said various sensors and located in proximity thereof, each of the latter said means including a variable capacitor connected to said calibrating oscillator and a relay connected to said remote-control means and adapted for connecting said capacitor to the capacitive-impedance sensors to form therewith a capacitance divider bridge coupled to said oscillator and to which the reference signal produced by said oscillator is applied for the checking and calibration of each said channel, and means for the checking and calibration of each said channel.

2. A network as claimed in claim 1 wherein each measurement-transmission means comprises a housing including and hermetically closed by a cover lid, a first printed-circuit board on said lid, said capacitor and relay being mounted on said circuit board, a second printed-circuit board including an impedance-matching circuit, sealed tubular bushings associated with said lid, a coaxial cable on the lid connected to at least one said capacitive-impedance sensor, and a multiconductor cable on the lid connected to the remote-control means.

3. A network as claimed in claim 1 wherein each measurement-transmission and control means includes a common-mode rejecting impedance circuit of wide passband characteristic, having symmetrical low-impedance outputs and consisting of a first stage formed by a field-effect transistor and a transistor producing unity gain, a second amplifying field-effect transistor including a gate electrode controlled by one of said sensors, and a symmetrical output stage including a transistor.

4. A network as claimed in claim 1 comprising, in said remote-control means, a control and protective circuit for each channel, including, on the one hand, a thermistor, a diode and a low-value resistor, through which flows the supply current for the measurement-transmission and control means associated with the corresponding channel and, on the other hand, a switching transistor connected in series with a signal lamp, and connected to the junction between the thermistor and the diode.

5. A network as claimed in claim 1 wherein said calibrating oscillator includes first, second and third transistors of NPN characteristic, including collectors connected together, and a fourth transistor of PNP characteristic, a first RC circuit including a first capacitor connected between the emitter of the first transistor and the base of the second transistor, and a first resistor connected between the base of the second transistor and ground, a second RC circuit including a second resistor connected between the emitter of the first transistor and the base of the third transistor, and a second capacitor connected between the base of the third transistor and ground, a third RC circuit containing a third resistor and a third capacitor series-connected between the emitters of the second and third transistors, a resistive voltage divider being formed by fourth and fifth resistors series-connected between the collectors of the second and third transistors, on the one side, and the emitter of the fourth transistor on the other side, with the junction between the fourth and fifth resistors being connected, on the one hand, to the base of the first transistor and, on the other hand, to be output of a differential-amplifier circuit which comprises the fifth and sixth resistors, the emitters of the second and third transistors being interconnected by sixth and seventh resistors in series, whose junction is connected to the collector of the fourth transistor and, via an eighth resistor, to the emitter of the first transistor, a power amplifier the input of which is connected by the intermediary of a ninth resistor and a fourth capacitor, in series, to the emitter of the first transistor, a transformer including a primary winding connected by a fifth capacitor to the output of the power amplifier, and a counterreactive secondary winding including several taps which are connected via first contacts for selection of calibrating voltage, actuated by pushbutton controls to calibration potentiometers jointly connected to input terminals of the differential amplifier.

6. A network as claimed in claim 5 wherein the transformer includes another secondary winding, which is connected via second contacts for calibrating voltage selection, to junctions of resistors forming a potential divider connected to one input terminal of a differential amplifier forming part of a measuring instrument, the output of said differential amplifier being connected to an AC input of a rectifier bridge, the other input of which is connected to ground by resistors, and a meter connected to the DC output terminals of the rectifier bridge.

7. A network as claimed in claim 4 wherein said remote-control means comprises a control bay including a first series of independent latch-in type pushbutton controls, which allow the energizing of each individual channel independently of the others, a second series of exclusive latch-in type pushbutton controls which allow connecting the output of the calibrating oscillator to any channel to be calibrated, a plurality of pushbuttons for selecting the amplitude of the output voltage from the calibrating oscillator, a pushbutton for starting operation of the oscillator, another pushbutton for shutting down operation of the oscillator for a test under actual conditions, a pushbutton for null verification of the measurement-transmission means, a pushbutton for general calibration of all the channels, a pushbutton for testing the signal, lamps and a pushbutton for oscillator testing.

8. A network as claimed in claim 7 wherein each channel-energizing pushbutton actuates a first N/O contact connected in series between the power supply and a pilot relay of which a first N/O contact is connected in series with the control relay incorporated in the measurement-transmission and control means associated with the corresponding channel, the pilot relay being also connected in series with a first N/O contact of the channel-calibration pushbutton control, and the pilot relay actuating its second and third N/O contacts in circuit between the calibrating oscillator and the measurement-transmission and control device for the purpose of placing in circuit the said variable capacitor of said device.

9. A measuring circuit comprising a plurality of detectors and associated detector circuits, a calibration oscillator, means for coupling said detector circuits to said oscillator, and calibrated cables coupling said detectors to said detector circuits, said means including an adjustable capacitor, said measuring circuits and detectors respectively having capacitances, the capacitances of said measuring circuits and detectors being coupled to said adjustable capacitor to constitute divider bridge, said oscillator being coupled to said bridge for the checking and calibration of each channel.

10. A measuring circuit as claimed in claim 9 comprising sealed housings, a measuring instrument, and matching circuits coupling the detector circuits to the measuring instrument, said housings enclosing said bridge and matching circuits.

11. A measuring circuit as claimed in claim 10 wherein said oscillator generates a signal of constant frequency and one of a plurality of constant magnitudes, comprising control means to select one of said magnitudes.

12. Precision multichannel remote-measuring network, each channel comprising:
 a protective and visualization circuit including a positive temperature coefficient thermistor, a diode and a resistance, a signal lamp, a switching transistor series-mounted with said signal lamp and controlled by said circuit, the transistor including an emitter and base of the said transistor connected respectively downstream and upstream of the diode in series with the resistance;
 a primary amplifier having differential inputs and outputs and a calibration network, a sealed detachable housing within which said amplifier and network are located;
 a capacitive-impedance sensor outside said housing, a coaxial cable, a pressuretight packing, the said primary amplifier comprising a pair of field-effect transistors including two gate electrodes which are connected to the capacitive-impedance sensor through said coaxial cable which enters the housing through said pressuretight packing; and
 a remote-controlled relay, the said calibration network comprising an adjustable capacitor connected through said remote-controlled relay in series with the said coaxial cable to the said sensor.

13. A precision multichannel remote-measuring network as in claim 1, comprising a one-way oscillator amplitude stabilized on four different levels and coupled to the adjustable capacitor and the sensor to form a calibrating circuit enabling four voltages to be generated at the sensor said oscillator comprising first, second and third transistors of NPN characteristic, including collectors connected together, and a fourth transistor of PNP characteristic, a first RC circuit including a first capacitor connected between the emitter of the first transistor and the base of the second transistor, and a first resistor connected between the base of the second transistor and ground, a second RC circuit including a second resistor connected between the emitter of the first transistor and the base of the third transistor, and a second capacitor connected between the base of the third transistor and ground, a third RC circuit containing a third resistor and a third capacitor series-connected between the emitters of the second and third transistors, a resistive voltage divider being formed by fourth and fifth resistors series-connected between the collectors of the second and third transistors, on the one side, and the emitter of the fourth transistor on the other side, with the junction between the fourth and fifth resistors being connected, on the one hand, to the base of the first transistor and, on the other hand, to be output of a differential-amplifier circuit which comprises the fifth and sixth resistors, the emitters of the second and third transistors being interconnected by sixth and seventh resistors in series, whose junction is connected to the collector of the fourth transistor and, via an eighth resistor, to the emitter of the first transistor, a power amplifier the input of which is connected by the intermediary of a ninth resistor and a fourth capacitor, in series, to the emitter of the first transistor, a transformer including a primary winding connected by a fifth capacitor to the output of the power amplifier, and a counterreactive secondary winding including several taps which are connected via first contacts for selection of calibrating voltage, actuated by pushbutton controls to calibration potentiometers jointly connected to input terminals of the differential amplifier.

14. A precision multichannel remote-measuring network as in claim 13 comprising:
- a first set of independently latching pushbuttons, signal lamps coupled to said pushbuttons and allowing remote control and checking of the energizing of each channel independently of the protective circuits of the other channels;
- independent relays, a second set of latching pushbuttons, signal lamps coupled to the latter said buttons and allowing remote connection of said oscillator by means of said independent relays onto any energized channel to be calibrated;
- a network of diodes including anodes and cathodes, and a latch-in pushbutton including a signal lamp connected to the anodes of said diode network whose cathodes are linked to the said relays allowing remote connection of the said oscillator simultaneously onto all of the energized channels.

15. A precision multichannel remote-measuring network as in claim 14 comprising:
- a measuring circuit, a second differential amplifier in each channel, controlled by the said first amplifier and having an output directly connectable through the said second set of pushbuttons onto said measuring circuit;
- a differential amplifier including negative and positive input and output, a rectifier bridge including inputs and DC outputs, a measurement device, said measuring circuit comprising a binary resistive divider network connected to the positive input of said differential amplifier, the output of the said differential amplifier being connected to one of the inputs of said rectifier bridge whose DC outputs are connected through said measurement device, another input of the said bridge being in common with the negative input of the said amplifier, and a resistance grounding said other input.

* * * * *